MULTIPLE SECTION RETRIEVAL SYSTEM

Filed June 26, 1964 4 Sheets-Sheet 1

INVENTORS
KENNETH D. FOULGER
ARTHUR G. SILVER

BY Ronald J. Clark
ATTORNEY

United States Patent Office 3,343,134
Patented Sept. 19, 1967

3,343,134

MULTIPLE SECTION RETRIEVAL SYSTEM

Kenneth D. Foulger, San Jose, Calif., and Arthur G. Silver, Endicott, N.Y., assignors to International Business Machines Corporation, New York, N.Y., a corporation of New York Filed June 26, 1964, Ser. No. 378,383
11 Claims. (Cl. 340—172.5)

ABSTRACT OF THE DISCLOSURE

The present disclosure is directed towards a record handling apparatus wherein each record is several fixed length sections in length. The first characters in the stored record hold numeric section characters identifying the number of sections in the record. Apparatus is described for locating a desired section at which the transfer is to begin, for manipulating the address and section characters required to retrieve a record and for controlling the inter-operation of these and other circuits.

Figure 1:
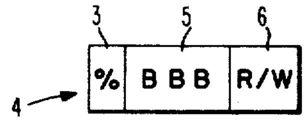

This invention relates to data transfer circuits and more particularly, to an improvement in the data handling circuits operating between a central processing unit and its Random Access File (RAF).

Generally, a data processing system includes an RAF as a permanent filing device for storing the great quantity of reference material required by the processor in performing its function. A typical file comprises a plurality of magnetic disks, magnetic drums or closed loop magnetic strips and their accessing mechanisms. The recording surface of a magnetic disk contains a plurality of concentric tracks physically separate from each other. Moreover, each track is normally subdivided into a plurality of fixed length sections and each section is used to store a separate message. Normally, the data capacity of each section determines the maximum message length which the file can hold. However, maximizing the storage capacity of the file is an important factor when establishing the length of each section. Therefore, an intermediate length section is normally chosen requiring the use of several sections to store an abnormally long message. The subdivision of this long message raises additional requirements in the retrieval and the recombination of the several sections comprising a message. Presently, each section is separately addressed by control words stored in the core memory of the associated processor, thereby requiring a complete list of section addresses to be kept external to the file. By utilizing existing data retrieval circuits, it is through the use of this type of address list that a program could be written to retrieve a plurality of random length messages from the file.

Accordingly, it is an object of the instant invention to provide a data handling circuit to automatically retrieve a random length message from a file with one programmed instruction.

It is a further object of the instant invention to conserve space in the core memory of its associate processor by operating with a minimum of external instruction.

It is a still further object of the instant invention to provide a data handling circuit for retrieving a plurality of standard length message sections from a storage file by addressing the first of said sections.

According to these objects, the instant invention contemplates the utilization of the addressing circuitry of its associated processor to retrieve an operation code from core memory, which code controls the multiple section retrieval operation. Additionally, the invention utilizes the core memory of the computer to hold the Disk Control Field (DCF) of the message to be retrieved. The DCF comprises an address area for designating the initial file section holding the first part of the message, a section length area which originally holds a number greater than one and which is subsequently refilled by the first several message characters retrieved from the file, and a message area large enough to hold the entire retrieved message. Once the section length area is filled, the section count characters contained therein control the automatic recycling of the instant invention in retrieving all sections comprising the message. Address compare circuits are employed to locate the first section in the storage file containing the beginning of the message. A recycle circuit controls the reversing of the processor interrogation circuits in order to perform a second compare operation in locating the designated section address. Finally, an add circuit is employed to decrease the section count characters in the DCF and increase the section address characters in the DCF.

Figure 2:
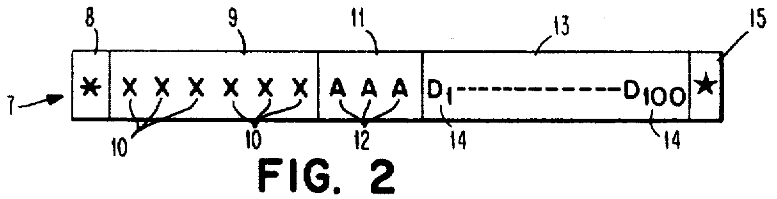
Figure 4:
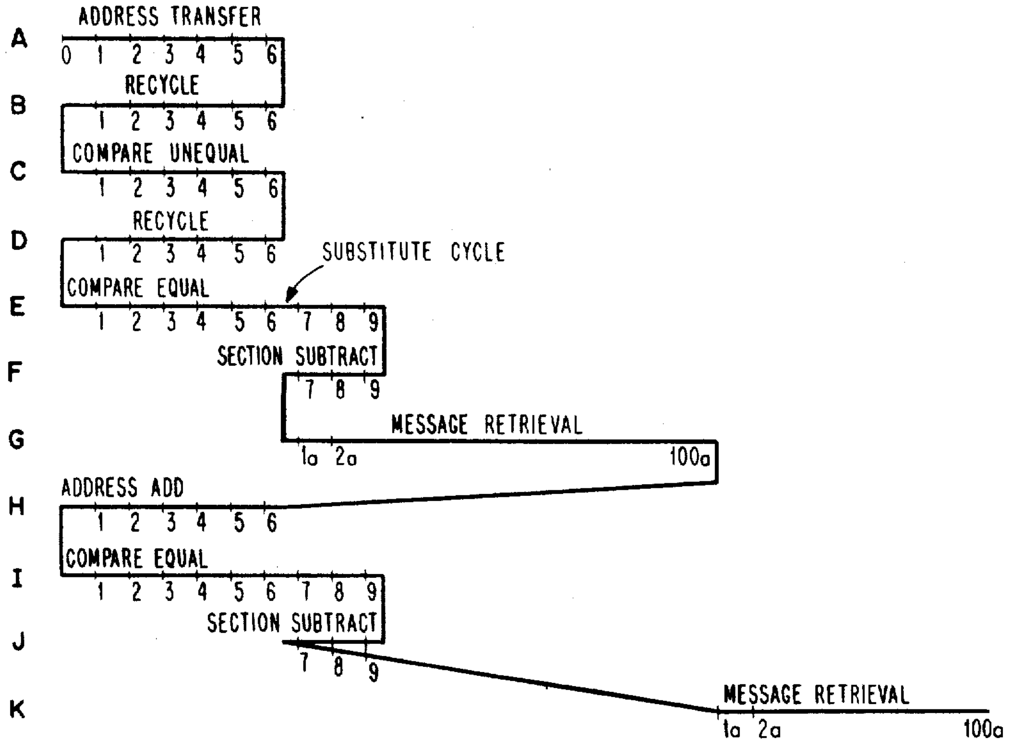
Figure 3A:
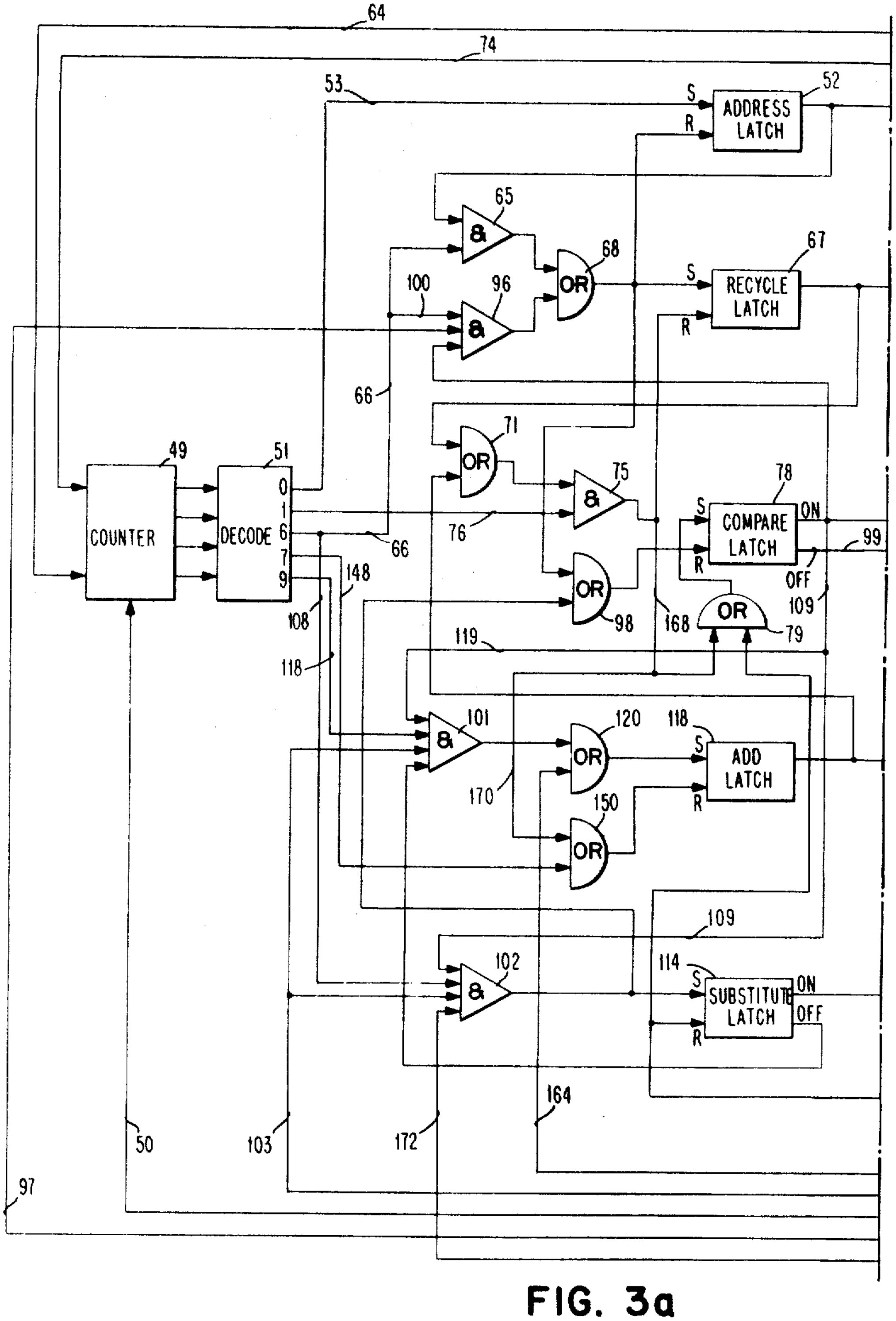
Figure 3B:
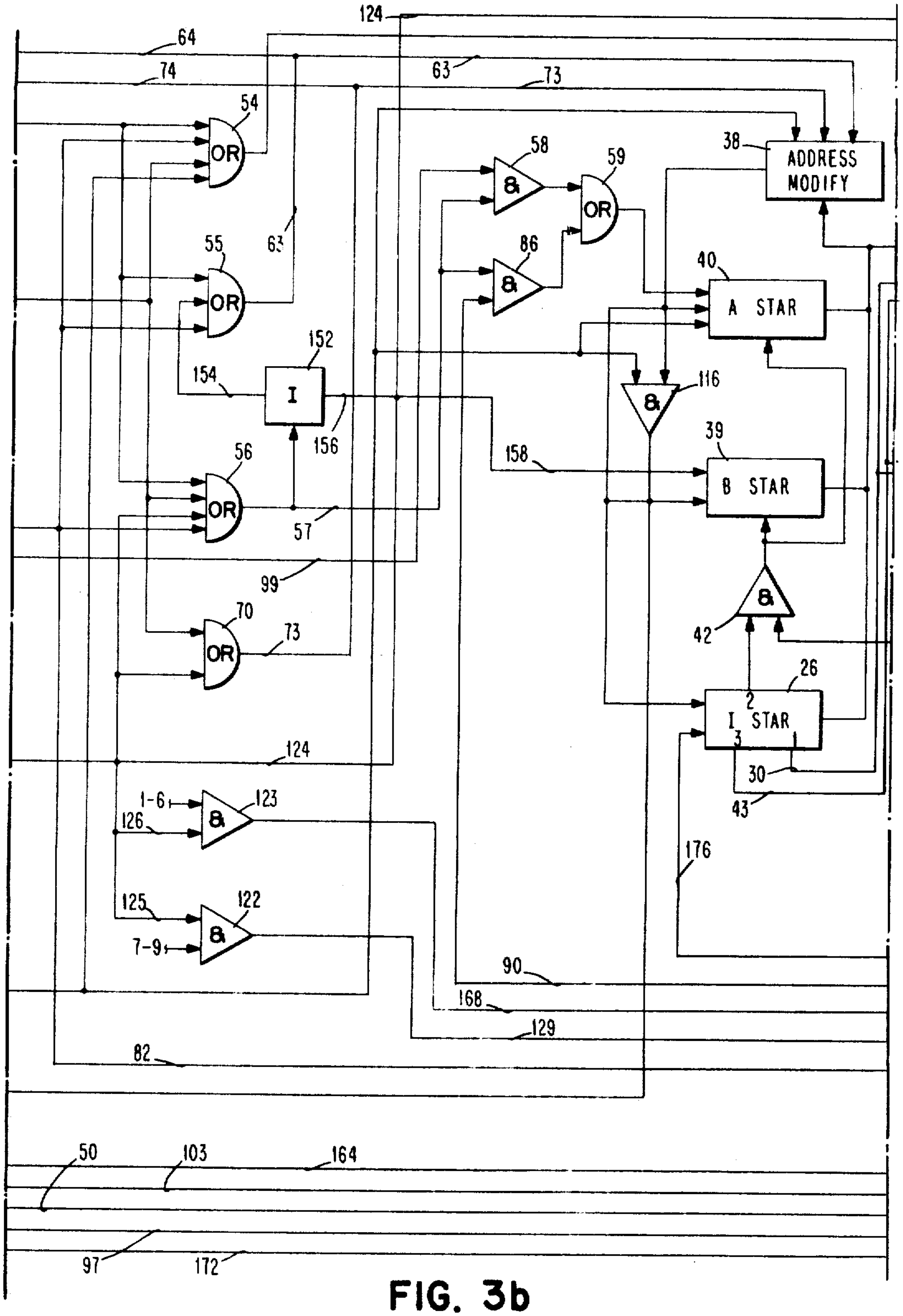
Figure 3C:
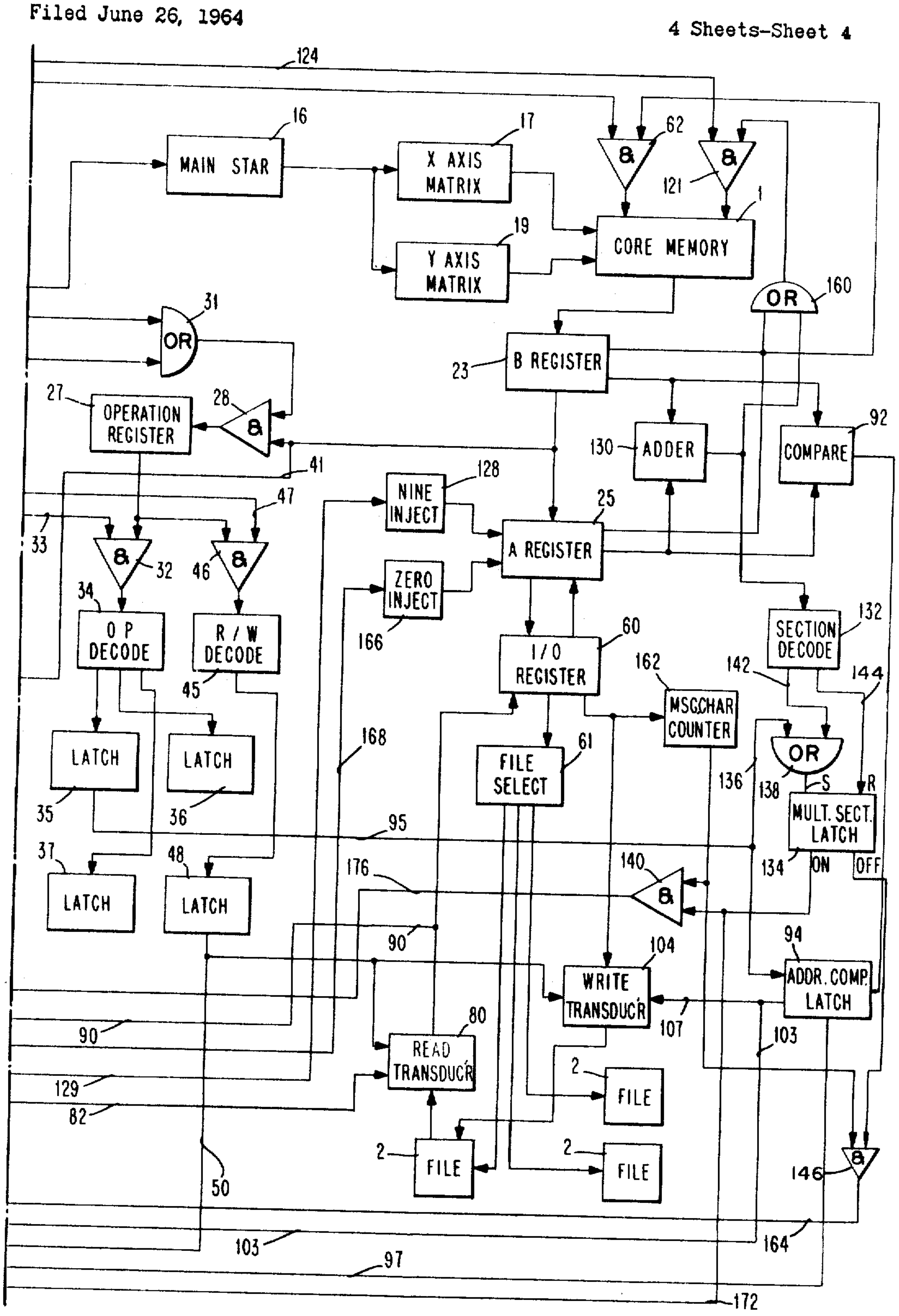

The foregoing and other objects, features and advantages of the invention will be apparent from the following more particular description of a preferred embodiment of the invention, as illustrated in the accompanying drawings; wherein FIG. 1 is a schematic representation of an operation code employed by the associated computer in a file operation;

FIG. 2 is a schematic representation of the Disk Control Field employed in the instant invention;

FIGS. 3*a*, 3*b* and 3*c* comprise a block diagram of the circuitry employed to accomplish an automatic retrieval of a multiple section message stored in a file; and FIG. 4 is a schematic diagram showing the multiple interrogation process of the Disk Control Field.

FIG. 3*c* shows a computer core memory 1 and a plurality of RAF modules 2 employed in the instant invention. The interrogation of the memory 1 is completely described by F. O. Underwood in his U.S. Patent 3,077,580, entitled "Data Processing System." For a better understanding of this memory interrogation circuitry as employed in the instant invention, the operation of these circuits are again shown and described. However, the detailed operation of these circuits is not repeated. Additionally, standard circuits are identified by name and are not described in detail since they are well known to those skilled in the art.

Referring to FIG. 1, a first portion 3 of an operation code 4 is reserved for indicia which indicates that the computer core memory 1 is to be engaged in a transfer operation with one of the files 2. A second portion 5 of this operation code contains additional indicia designating the address location in the core memory 1 of the first character in the Disk Control Field (DCF), described hereinafter, of the message to be transferred. A third portion 6 of the operation code 4 contains indicia indicating that a read or write operation is to be performed.

FIG. 2 shows a typical DCF format 7 held in the core storage circuit 1. A first area 8 of the DCF format comprises a character indicating a normal module selection process or an alternate method of selecting a substituted module. If the alternate method of module selection is indicated, the character in the area 8 determines which module is selected. A second area 9 of the DCF format holds a plurality of address characters 10 which designate the section address of a RAF section into which or from which the message is to be transferred. A third area 11 of the DCF format normally holds a plurality of section count characters 12 which indicate the length of the message to be transferred according to the number of sections involved in the data transfer. However, in a multiple section retrieval operation, the third area 11 is originally filled with a plurality of characters which collectively specify any number greater than one. Thereafter during the data retrieval operation, the first characters read from the file are substituted for the number contained in the area 11. Additionally, these substituted characters indicate the number of sections involved in the multiple section retrieval operation. A final area 13 of the DCF format 7 contains a plurality of message characters 14 including a message ending indicia 15. In the cases when groups of message characters are read from the file 2 to core memory 1, the final area 13 of the DCF format 7 is left blank so that the message characters from the file can be stored during the data transfer operation.

FIGS. 1 and 2 show schematic representations of the indicia and characters employed in the operating code 4 and DCF format 7 respectively. Obviously, these indicia and characters are actually stored in magnetic cores as a pattern of binary coded magnetic signals.

Referring again to FIG. 3*c*, the core memeory 1 contains all the information for controlling the internal operation of the processor and the data transfer operation between the processor and one of the files 2. Each character in the DCF format 7 is set up in a separate storage location in core memeory 1 by standard programming techniques which need not be described. In the present description, successive storage locations are employed to hold the characters in a DCF format 7 and to simplify the understanding of the memory interrogation operation. Each storage location in core memeory 1 is interrogated by a main Storage Address Register (STAR) 16 and an address select matrix circuit comprising an X axis matrix 17 and a Y axis matrix 19. Upon the interrogation of a particular core memory storage location, the character stored therein is read out into a B register 23 and/or an A register 25.

The core memeory address of the first indicia of the operation code 2, shown in FIG. 1, is set into an I STAR 26 by standard computer advancement techniques. That is, as soon as one computer operation is completed, the computer advances to the next programmed operation. The indicia in the first portion 3 of the operation code 4 is interrogated under control of the I STAR 26 and the main STAR 16 and is transferred to an operation register 27 by the B register 23 and an AND gate 28. The I STAR 26 also generates a plurality of enabling output signals which correspond to the various portions of the operation code 4. The first enabling output signal from the I STAR 26 is applied to the AND gate 28 by a line 30 and an OR gate 31 and it is also applied to an AND gate 32 by the line 30 and a line 33. The operation register 27 is connected to an operation decode circuit 34 by the AND gate 32.

The indicia in portion 3 of the operation code 4 indicates the type of operation performed between the file 2 and core memory 1. The operation decode circuit 34 comprises a plurality of matrices for decoding the indicia in portion 3 and it applies an output signal corresponding to each different indicia to a plurality of latches 35, 36 and 37, the functioning of each is described hereinafter.

An address modify circuit 38 receives an input signal from the I STAR 26, a B STAR 39, and an A STAR 40 after their interrogation of each storage location. Prior to the interrogation of the next storage location, the modify circuit 38 applies its output to the I STAR 26 advancing the address held in I STAR 26 to the next adjacent memory storage location. The B STAR 39 and the A STAR 40 receive advancing signals from the address modify circuit 38 when either of these registers is directing the interrogation of the core memory 1.

During the continued interrogation of core memory 1 by the I STAR 26, the second portion 5 of the operation code 4 is transferred to the A STAR 40 and the B STAR 39 by the B register 23, a line 41 and an AND gate 42. The AND gate 42 has a second input signal, which signal is the second enabling output signal from the I STAR 26. The A STAR 40 and the B STAR 39 now contain the address location in core storage of the first character of the DCF format 7. The I STAR 26 continues its interrogation of the core memory 1 and transfers the third portion 6 of the operation code 4 to the operation register 27 by the AND gate 28. The AND gate 28 receives an enabling input signal from the I STAR 26 by a line 43 and the OR gate 31. The output from the register 27 is applied to a read/write decode circuit 45 by an AND gate 46. The AND gate 46 has a second input signal from the I STAR 26 which signal is applied to the AND gate 46 by the line 43 and a line 47. The output of the decode circuit 45 is stored in a latch 48 for later use in transferring the message from one of the selected files 2 to core memory 1. Additionally, the setting of the latch 48 is employed to indicate the completion of the operation code interrogation operation. The output of the latch 48 is applied to a control counter 49 by a line 50 setting the counter to its binary zero position.

The counter 49 is a standard counter circuit and may comprise four stages giving the counter a maximum binary count of sixteen positions which are normally labeled position zero through position fifteen. The output signals from each stage in the counter are applied to a decode circuit 51 which generates a single enabling signal corresponding to each position of the counter. The counter 49 advances simultaneously with the interrogation operation to be described hereinafter. The zero position of the control counter 49 is decoded in the decode circuit 51 and applied to an address latch 52 by a line 53. The output of the address latch 52 is applied to a plurality of OR gates 54, 55 and 56.

The output signal of the OR gate 56 is applied to the A STAR 40 by a line 57, and AND gate 58 and an OR gate 59, and is employed to transfer the control of the core memory 1 interrogation operation from the I STAR 26 to the A STAR 40. The AND gate 58 has a second enabling signal applied thereto from a compare latch 78 described hereinafter. The A STAR 40 contains the core memory address of the first character in the DCF format 7. This character is read from core storage 1 through the A and B registers 25 and 23 respectively and an I/O register 60 into a file select circuit 61. The file select circuit 61 is completely described by Foulger et al. in their copending application entitled "File Selection System," assigned to the assignee of the present invention Ser. No. 383,541. The select circuit 61 indicates which one of the files 2 is to receive a message from or supply a message to the core memory 1.

The output of the OR gate 54 is applied to an AND gate 62 and is employed to reinsert the first character of the DCF format 7 into the same character location in core memory just interrogated. During a subsequent operation, the output of the OR gates 54 is also employed to perform similar reinsertion operations. The output of the OR gate is applied to the address modify circuit 38 by a line 63 indicating that the address in the A STAR 40 is to be increased by one. Additionally, the output of the OR gate 55 is applied to the control counter 49 by the line 63 and a line 64 indicating that the control counter 49 is to advance one position. Areas 8 and 9 of the DCF format 7 shown in FIG. 2 are successively interrogated from core memory 1 and are transferred to the file select circuit 61 for selecting a desired module 2 as described in the previously identified patent application.

Referring to line A of FIG. 4, the entire address transfer operation is schematically shown. The identifying numerals 0–9 shown throughout FIG. 4 correspond to the binary number generated by the control counter 49. Each time a new character position of core memory is interrogated, the control counter advances one position and applies its output signals to the decode circuit 51. The output signals from the decode circuit 51 correspond to successive characters in the DCF format 7 shown in FIG. 2 and are employed to distinguish which character of the DCF format 7 is presently being interrogated from core memory. The numerals 1*a* through 100*a* represents the message characters from the area 13 of the DCF format 7 involved in the data transfer operation. These numerals are generated in a message character counter described hereinafter.

Referring again to FIG. 3*a*, when control counter 49 reaches its binary six position, the decode circuit 51 applies an output signal to an AND gate 65 by a line 66. The AND gate 65 has a second enabling signal applied thereto from the address latch 52. The output of the AND gate 65 is applied to a recycle latch 67 by an OR gate 68. The output of the OR gate 68 also resets the address latch 52 to its second stable condition wherein it ceases to generate its enabling output signal. The recycle latch 67 is set to its first stable condition wherein it applies its enabling output signal to the OR gates 54 and 56, and to an additional pair of OR gates 70 and 71. The output signal from the OR gate 54 continues to reinsert each interrogated character into the same core memory location and the output signal from the OR gate 56 continues the interrogation of the core memory 1 under the control of the A STAR 40. The output from the OR gate 70 is applied to the address modifier circuit 38 by the line 73 indicating that the core memory address just interrogated is modified by a minus one causing a recycling of the core memory 1 back through the address area 9 of the DCF format 7. The output of the OR gate 70 is also applied to the counter 49 by the line 73 and a line 74 decreasing the counter 49 one position for each character interrogated. The output of the OR gate 71 is applied to an AND gate 75 as an enabling signal, the significance of which is described hereinafter.

Referring again to FIG. 4, line B, the operation of the interrogation circuits of the core memory 1 is reversed and the interrogation operation recycles back to character position one of the address portion 9 of the DCF format 7. At this time, the control counter 49 again is in the binary decode one position and its decode circuit 51 applies its output signal to the AND gate 75 by a line 76, which gate has been previously enabled by the output signal of the OR gate 71. The output signal of the A–D gate 75 sets a compare latch 78 to its first stable state by an OR gate 79 wherein it applies its "ON" enabling output signal to the OR gates 54, 55 and 56.

The setting of the compare gate latch 78 indicates that the address portion 9 of the DCF format 7 is to be reinterrogated from the core memory 1. Additionally, the output from the compare latch 78 is applied to a read transducer 80 of the selected file 2 by a line 82. The read transducer transfers the permanently recorded file section address information from the file 2 to the A register 25 by the I/O register 60. The output from the OR gate 56 is applied to the A STAR 40 by the line 57, an AND gate 86 and the OR gate 59 causing the A STAR 40 to interrogate the first character of the address portion of the DCF format 7. The AND gate 86 has a second input signal applied thereto from the read transducer 80 by a line 90. This second input signal comprises a sector pulse read from the file 2 by any one of a plurality of well-known methods. Each section of the file 2 is prefaced with a sector pulse and each pulse indicates that the section address follows immediately. The sector pulse is employed in the instant invention to synchronize the interrogation of the address portion 9 in the DCF format 7 from core memory 1 and the reading of the section address from the file 2 by the read transducer 80.

The first address character of the address portion 9 is transferred into the B register 23. Simultaneously, the first character of the section address is read from the file 2 by the read transducer 80 and is placed into the A register 25 through the I/O register 60. The output of the A register 25 and the B register 23 is applied to a compare circuit 92. The compare circuit is of standard construction and generates an output signal when the two address characters are not the same. The output of the compare circuit is applied to an address compare latch 94 setting it to its second stable state wherein it generates a not equal output signal. Originally, the address compare latch 94 is set to its first stable state wherein it generates an output signal indicating that an equal condition exists. The address compare latch 94 is set to its first stable condition by the output of the latch 35 by a line 95. If the results of the first character comparison indicates a match, the condition of the compare latch remains unchanged. However, if the output of a compare circuit indicates a mismatch, the compare latch is driven to its second stable state wherein it generates an output signal indicating that the address being interrogated from core memory 1 is not the same address being read from file 2. The compare unequal output signal from the compare latch is applied to an AND gate 96 by a line 97. Successive characters in the address portion 9 of the DCF format 7 are compared with successive characters read from the address portion of the file 2.

The result of each successive compare operation is applied to the compare latch 94. At the end of an address compare operation the recycle latch 67 is turned on by the AND gate 96 and the OR gate 68. The output of the OR gate 68 resets the compare latch 78 by an OR gate 98 resetting the latch to its second stable state wherein it generates an "OFF" or second enabling output signal for application to the AND gate 58 by a line 99. The AND gate 96 has three input signals; the first of which is the not equal output signal of the address compare latch 94, the second of which is the decode six signal on the line 66 and a line 100 from the decode circuit 51, and the third of which is the "ON" enabling output signal from the compare gate latch 78. This recycle operation is the same as the previous recycle operation and comprises utilizing the address stored in the A STAR 40 to interrogate a character from a memory location under the control of the OR gate 56, reinserting this character back into the same memory location under the control of the OR gate 54, and decreasing the contents of the control counter 49 and the address modify circuit 38 by one under the control of the OR gate 70. Referring to lines C and D of FIG. 4, it can be seen that the recycle operation also follows a compare unequal operation and reverses the interrogation process back to the first character of the address portion 9 in the DCF format 7.

When the control counter 49 is decreased to its binary one position, the decode circuit 51 applies its decode one signal to the AND gate 75 by the line 76. The AND gate 75 has a second enabling input signal applied thereto from the recycle latch 67 and the OR gate 71. The output of the AND gate 75 resets the recycle latch 67 and sets the compare latch 78 by the OR gate 79, beginning a second compare operation. The first character stored in the core memory 1 is again transferred to the B register 23 and the first character of the section address read from the next successive message of the file 2 is transferred to the A register 25. The outputs of the A register 25 and the B register 23 are compared in the compare circuit 92 and the resulting signal is applied to the address compare latch 94. Successive interrogation cycles and reading cycles compare all characters in the address portion 9 of the DCF format 7 and the message address of the file 2. When the address compare latch 94 generates an equal compare signal, it applies the compare equal signal to a pair of AND gates 101 and 102 by a line 103 and to a write transducer 104 by a line 107.

Referring to line E of FIG. 4, it can be seen that the control counter 49 and the A STAR 40 advance to character position six of the DCF format 7. The decode circuit 51 generates an enabling output signal on its decode six output line 66, and applies it to the AND gate 102 by a line 108. The AND gate 102 has an additional enabling input signal applied thereto from the compare latch 78 by a line 109. The output of the AND gate 102 resets the compare latch 78 by the OR gate 98 and sets a substitute latch 114 to its first stable state wherein it generates an enabling output signal for application to the address modify circuit 38, the A STAR 40, the OR gate 54 and an AND gate 116. This enabling signal causes the A STAR 40 to interrogate the memory location corresponding to character position six of the DCF format 7, to modify this address plus one and to insert the modified address into the B STAR 39 by the AND gate 116. The interrogated character is transferred to the B register 23 and reinserted into the same memory location by the AND gate 62.

The last interrogation operation has advanced the address held in the B STAR 39 to the seventh character location of the DCF format 7 while keeping the address of the A STAR 40 to the sixth character location. The significance of this operation is that the seventh character position of the DCF format 7 holds the first section count character specifying the number of sections to be transferred from the file. Presently, the section characters do not truly represent the number of sections in the transfer operation, but only must represent a number greater than one. Therefore, when the B STAR 39 controls the addressing of core memory as described hereinafter, the message is transferred from the file starting with the section characters which replace those characters presently in the section area 11 of the DCF format 7. At the completion of this operation the substitute latch 114 is reset by a signal from the AND gate 116 setting the latch to its second stable state.

Additionally, the output of the AND gate 116 is applied to the OR gate 79 setting the compare latch 78 to its first stable state. The address substitute operation is performed by the core memory interrogation circuits at a considerably faster rate than the operation of the file. Therefore, at the completion of the address substitute operation, the read transducer 80 of the selected file 2 is still reading the file character which corresponds to the decode six position of the decode circuit 51.

Referring again to line E of FIG. 4, the processor interrogation circuits advance to character position nine of the DCF format 7. At this time, the decode circuit 51 applies its decode nine signal to the AND gate 101 by a line 118. The AND gate 101 has two additional enabling signals applied thereto; the first of which is the "ON" enabling output signal from the compare latch 78 over the line 109 and a line 119, and the other of which is the "OFF" enabling output signal from the substitute latch 114. The output of the AND gate 101 is applied to an add latch 118 by means of an OR gate 120, setting the add latch 118 to its first stable condition whereby it generates an enabling signal for application to the OR gates 56, 70 and 71 and a plurality of AND gates 121, 122 and 123 by lines 124, 125 and 126, respectively. The AND gate 122 has an additional enabling signal applied thereto from decode position nine, eight or seven from the decode circuit 51. The output of the AND gate 122 is connected to a nine inject circuit 128 by a line 129. The inject circuit 128 is connected to the A register 25 and is employed to inject a binary nine character into the A register 25 simultaneously with the reverse interrogation of each section character 12 in the area 11 of the DCF format 7. The outputs from the B register 23 and the A register 25 are applied to an adder circuit 130 wherein the contents of the B register is added to the contents of the A register. The output of the adder 130 is applied to a section decode circuit 132 and reinserted into the core memory 1 by the AND gate 121. The OR gate 70 furnishes an enabling signal to the address modify circuit 38, causing that circuit to decrease the address stored in the A STAR 40 by one, and furnishes the same enabling signal to the control counter 49 to decrease its count by one.

Referring to line F of FIG. 4, it can be seen that this reverse interrogation is repeated through the decode seven position. By the reverse interrogation of area 11 of the DCF format 7, and the adding of a numeral nine to the characters in this area, the number represented by all the section count characters in the area 11 is reduced by one. The section decode circuit 132 tests the result of each adding operation to determine when the result of each adding operation is zero. A zero result indicates that the succeeding data transfer operation is the last group of characters to be transferred from the file 2 in the present multiple section retrieval operation.

The output signal from the latch 35 is applied to a multiple section latch 134 by the line 95, a line 136 and an OR gate 138 setting the latch to its first stable state wherein it applies its "ON" enabling output signal to an AND gate 140. The "ZERO" output signal from the section decode circuit 132 is applied to the OR gate 138 by a line 142, and the "NOT ZERO" output signal from the section decode circuit 132 is applied to the latch 134 by a line 144 setting the latch 134 to its second stable state wherein it generates an "OFF" enabling output signal for application to an AND gate 146.

While the final character in the section portion 11 of the DCF format 7 is being added to the numeral nine in the adder 130, the decode position seven of the decode circuit 51 is applied as a reset pulse to the add latch 118 by a line 148 and an OR gate 150 driving the add latch 118 to its second stable state wherein it removes its enabling output signal from the OR gates 56, 70 and 71. During the last interrogation operation, the address held in A STAR 40 is reduced an additional character position to the last character position of the address portion 9 in the DCF format 7. Additionally, the control counter was decreased to its decode six position. Immediately upon the resetting of the add latch 118, the OR gate 56 loses its only enabling signal. Therefore, the low output of the OR gate 56 is inverted in an inverter 152 and the inverted signal is applied to the OR gates 55 and 121 and to the B STAR 39 by a line 154, a line 156 and the line 124, and the line 156 and a line 158, respectively. This enabling signal from the inverter 152 causes the interrogation of the address position held in B STAR 39.

Referring to line G of FIG. 4, the address held in B STAR 39 corresponds to the first character of the section count area 11 in the DCF format 7. This first character from the file 2 is transferred by the read transducer 80 through the I/O register 60 and the A register 25 to an OR gate 160. The output of the OR gate 160 is inserted into the interrogated core memory address by the AND gate 121. Each character read from the file is counted by means of a character counter 162. The character counter 162 is a standard counter operating to count successive characters in groups of one hundred. After each one-hundred group of characters, it generates an output signal for application to the AND gates 140 and 146. The B STAR 39 continues its interrogation operation of successive memory locations until a group of hundred message characters has been transferred from the file 2.

After the retrieval of the initial group of characters from the file, the output from the AND gate 146 is applied to the OR gate 120 by a line 164 setting the add latch 118 to its first stable state wherein it generates an enabling output signal for application to the OR gates 56, 70 and 71. The output of the OR gate 56 changes the control of the computer interrogation operation from the B STAR 39 to the A STAR 40. Additionally, the output of the OR circuit 70 causes the address modifier circuit 38 to reduce the address location held in A STAR 40 by one for each address interrogation operation. The output of the add latch 118 is also applied to the AND gate 123. The AND gate 123 has a second enabling input signal from decode positions one through six of the decode circuit 51. The output of the AND gate 123 is applied to a zero inject circuit 166 by a line 168. The inject circuit 166 operates to inject the numeral zero into the A register 25 during the present decreasing of the control counter 49 through decode position six through one. Simultaneously with the injecting of the first zero into the A register 25, the A STAR 40 interrogates core memory and transfers the last character of the address area 9 into the B register 23.

The output of the A register 25 and B register 23 are applied to the adder circuit 130. The adder utilizes the carry digit from the preceding subtract operation to increase the last character of the address area 7 by one. The results of the addition is reinserted to the same address memory location just interrogated by the OR gate 160 and the AND gate 121. The A STAR 40 recycles back through the address area 9, adding zero to each character in the address area 9 of the DCF format 5. Therefore, by adding the numeral zero to each character in the address area 9 and by using the carry digit from the preceding addition operation, if any, the characters in the address area 9 are increased by one.

In this manner the address held in core storage has been increased by one so that during the next address compare cycle, employing the next successive address of the next section file 2, an address compare equal signal will be generated by the compare circuit 92.

Referring to line H of FIG. 4, the entire address held in core storage has been interrogated and increased by one. Upon reaching the decode position one, the decode circuit 51 applies its enabling output signal to the AND gate 75 and a second address compare cycle is initiated. Additionally, the output of the AND gate 75 resets the add latch 118 by the AND gate 150 and a line 170.

Referring to line I of FIG. 4, this standard address compare cycle includes the interrogation of characters one through nine of the DCF format 7. Upon reaching the character nine, the standard section count subtract operation is initiated by the add latch 118 and the AND gate 122. Upon the completion of the standard subtract operation, the add latch 118 is reset by the decode seven signal from the decode circuit 51 over the line 148. The substitute latch 114 is not set between the immediately preceding compare equal operation and section count subtract operation because of the absence of an "ON" enabling output from the latch 134 to the AND gate 102 as applied thereto by a line 172.

Referring to line K of FIG. 4, the control of the computer interrogation operation is again under the control of the B STAR 39 and an additional character group is read from the file 2. As previously mentioned, this transferral of the control of the memory interrogation operation to the B STAR 39 is initiated by the output of the inverter 152. Additional address add operations, address compare operations, and section count subtract operations are continued until, at the end of the final subtract operation, the sector decode circuit 132 generates an output signal on its "ZERO" output line 142 indicating that the sector area 11 of the DCF format 7 has been reduced to zero and applies the "ZERO" signal to the OR gate 138. The output signal of the OR gate 138 sets the latch 134 to its second stable state wherein it generates an enabling output signal for application to an AND gate 140. The AND gate 140 has a second input signal from the character counter 162. The output of the AND gate 162 is applied to the I STAR 26 by a line 176 indicating that at the termination of the next B cycle operation, the computer is to advance to the next operation code 4.

The increased operating speed of the computer is employed during the substitute operations, section count subtract operation and address add operation to complete their operation prior to the reception of the next signal from the file 2.

While the invention has been particularly shown and described with reference to a preferred embodiment thereof, it will be understood by those skilled in the art that various changes in form and details may be made therein without departing from the spirit and scope of the invention.

What is claimed is:

1. In a message retrieval system for retrieving a plurality of groups of characters from a plurality of individually addressable file sections and for reconnecting the character groups into a single message, multiple section retrieval system comprising, storage means for storing a section address of that file section from which an initial character group is to be transferred, means for utilizing said stored section address to designate the file section from which said initial group is to be retrieved, means for reading said initial group from said designated section, said storage means being employed for storing said initial character group, said initial character group having a section count portion for storing section count indicia, means for using said section count in said initial character group to maintain count of the total number of file sections that are to furnish additional message characters, means for modifying said stored section address to designate the next file section from which the next character group is to be retrieved, means for comparing said modified section address with that of the next file section, said reading means being employed for reading the next successive character group from the next file section to be addressed, said storage means being employed for storing each successive character group adjacent to the preceding group, means for modifying said section count as each successive group of characters is read from each different designated file section, and means for transferring control to said section address modifying means until all message file groups are read from respective corresponding file sections.

2. In a message retrieval system for retrieving a plurality of groups of characters from a plurality of individually addressable file sections and for reconnecting the character groups into a single message, a multiple section retrieval system comprising, storage means for storing a section address of that file section from which an initial character group is to be transferred, means for utilizing said stored section address to designate the file section from which said initial group is to be retrieved, means for reading said initial group from said designated section, said storage means being employed for storing said initial character group, said initial character group having a section count portion for storing a plurality of section count indicia, means for using said section count in the initial character group to maintain the count of total number of file sections that are to furnish additional message characters, means for modifying said stored section address to designate the next file section from which the next character group is to be retrieved, means for comparing said modified section address with that of the next file section, means for modifying said section count to denote the reduced number of file sections still to furnish message characters, said reading means being employed for reading the next successive character group from the next file section to be addressed, said storage means being employed for storing each successive character group adjacent to the preceding group, and means for transferring control to said section address modifying means until all message file groups are read from respective corresponding file sections.

3. In a message retrieval system for retrieving a plurality of individually addressable file sections and for reconnecting the character groups into a single message, a multiple section retrieval system comprising, storage means for storing a section address of that file section from which an initial character group is to be transferred, means for utilizing said stored section address to designate the file section from which said initial group is to be retrieved, means for reading said initial group from said designated section, said storage means being employed for storing said initial character group, said initial character group having a section count portion containing section count indicia, means for using said section count in said initial character group to maintain count of the total number of file sections that are to furnish additional message characters, means for modifying said stored section address by a predetermined number to designate the next file section from which the next character group is to be retrieved, means for comparing said modified section address with that of the next file section, means for modifying said section count by a predetermined number of sections to denote the reduced number of file sections still to furnish message characters, said reading means being employed for reading the next successive character group from the next file section to be addressed, said storage means being employed for storing each successive character group adjacent to the preceding group, and means for transferring control to said section address modifying means until all message file groups are read from respective corresponding file sections.

4. In a message retrieval system for retrieving a plurality of groups of characters from a plurality of individually addressable file sections and for reconnecting the character groups into a single message, a multiple section retrieval system comprising, storage means for storing a section address of that file section from which an initial character group is to be transferred, means for utilizing said stored section address to designate a file section from which said initial group is to be retrieved, means for reading said initial group from said designated section, said storage means being employed for storing said initial character group, said initial character group having a section count portion for holding section count indicia, means for using said section count in said initial character group to indicate the total number of file sections that are to furnish additional message characters, means for modifying said stored section address by one to designate the next file section from which the next character group is to be retrieved means for comparing said modified section address with that of the next successive file section, means for modifying said section count by one to denote the reduced number of file sections still to furnish message characters, said reading means being employed for reading the next successive character group from the next successive file section, said storage means being employed for storing each successive character group adjacent to the preceding group, and means for transferring control to said section address modifying means until all message file groups are read from respective corresponding file sections.

5. In a message retrieval system for retrieving a plurality of groups of characters from a plurality of individually addressable file sections and for reconnecting the character groups into a single message, a multiple section retrieval system comprising, storage means for storing a section address of that file section from which an initial character group is to be transferred, said storage means being employed for storing a section count sufficient to permit the retrieval of more than said initial character group, means for utilizing said stored section address to designate the file section from which said initial group is to be retrieved, means for reading said initial group from said designated section, said storage means being employed for storing said initial character group, said initial character group having a section count portion for holding section count indicia, means for substituting said section count in the initial character group for said stored section count, means for using said substituted section count to indicate the total number of file sections that are to furnish additional message characters, means for modifying said stored section address to designate the next file section from which the next character group is to be retrieved, means for comparing said modified section address with that of the next file section, said reading means being employed for reading the next successive character group from the next file section to be addressed, said storage means being employed for storing each successive character group adjacent to the preceding group, and means for modifying said substituted section count as each successive group of characters is read from each different designated file section.

6. In a message retrieval system for retrieving a plurality of groups of characters from a plurality of individually addressable file sections and for reconnecting the character groups into a single message, a multiple section retrieval system comprising, storage means for storing a section address of that file section from which an initial character group is to be transferred, means for reading the file section address from the file, means for comparing said stored section address with the file section address, means for testing the results of said comparison for conformity between said compared addresses, said reading means being employed for reading said initial group from said addressed section, said storage means being employed for storing said initial character group, said initial character group having a section count portion for holding section count indicia, means for using said section count in the initial character group to indicate the total number of file sections that are to furnish additional message characters, means for modifying said stored section address to designate the next file section which is to furnish an additional character group, said reading means being employed for reading the next file section address from the file, said comparing means being employed for comparing said modified section address with the next file section address, said testing means being employed for testing the results of said comparison for conformity between the compared addresses, said reading means being employed for reading the next successive character group from the next file section to be addressed, said storage means being employed for storing each successive character group adjacent to the preceding group, and means for modifying said section count as each successive one of said character groups is read from each different designated file section.

7. In a message retrieval system for retrieving a plurality of groups of characters from a plurality of individually addressable file sections and for reconnecting the character groups into a single message, a multiple section retrieval system comprising, storage means for storing a section address of that file section from which an initial character group is to be transferred, said storage means being employed for storing a section count sufficient to permit the retrieval of more than the initial character group, means for reading the file section address from the file, means for comparing said stored section address with the file section address, means for testing the results of said comparison for conformity between said compared addresses, reading said reading means being employed for said initial character group from said addressed section, said storage means being employed for storing said initial character group, said initial character group having a section count portion for holding section count indicia, means for substituting said section count in the initial character group for said stored section count, means for using said substituted section count to indicate the total number of file sections that are to furnish additional message characters, means for modifying said stored section address to designate the next file section which is to furnish an additional character group, said reading means being employed for reading the next file section address from the file, said comparing means being employed for comparing said modified section address with the next file section address, said testing means being employed for testing the results of said comparison for conformity between the compared addresses, means for modifying said substituted section count to denote the reduced number of file sections still to furnish additional message characters, said reading means being employed for reading the next successive character group from the next file section to be addressed, and said storage means being employed for storing each successive character group.

8. In a message retrieval system for retrieving a plurality of groups of characters from a plurality of individually addressable file sections and for reconnecting the character groups into a single message, a multiple section retrieval system comprising, storage means for storing a section address of that file section from which an initial character group is to be transferred, said storage means being employed for storing a section count sufficient to permit the retrieval of more than the initial character group, means for interrogating said stored section address corresponding to the initial file section which furnishes the initial group of characters, means for reading the file section address from the file, means for comparing said interrogated section address with the file section address, means for testing the results of said comparisons for conformity between the compared addresses, means for recycling said interrogation of the stored section address back to the beginning to said stored section address when said testing shows nonconformity between the compared addresses, means for transferring control to said interrogation means until said testing shows conformity between the compared addresses, said reading means being employed for reading said initial character group from said addressed section, said storage means being employed for storing said initial character group, said initial character group having a section count portion for holding section count indicia, means for substituting said section count in the initial character group for said stored section count, means for using said substituted section count to indicate the total number of file sections that are to furnish additional message characters, means for increasing said stored section address by one to designate the next file section which is to furnish an additional character group, said interrogating means being employed for interrogating said increased section address corresponding to the next file section which furnishes the next successive group of characters, means for reading the section address from the file, said comparing means being employed for comparing said increased section address with the address read from the file, said testing means being employed for testing the results of said comparison for conformity between the compared addresses, means for reducing said substituted section count to denote the reduced number of file sections still to furnish additional message characters, said reading means being employed for reading the next successive character group from the next successive file section, said storage means being employed for storing each successive character group adjacent to the preceding group, and means for transferring control to said section address increasing means until all message file groups are read from their respective corresponding file sections.

9. In a data processing system employing a computer responsive to predetermined operation codes for transferring a plurality of groups of characters stored in a plurality of individually addressable storage sections from a file module to a computer, a multiple section retrieval circuit comprising, a storage circuit, a plurality of operation codes stored in said storage circuit, a plurality of address characters stored in said storage circuit for designating the file module section from which the initial group is to be retrieved, a plurality of section characters stored in said storage circuit for permitting the retrieval of more than the initial group from said designated file section, means responsive to said operation codes for selectively interrogating said stored characters, means responsive to said operation codes for reading the section addresses from the file, means responsive to said stored address characters and said section address read from the file to locate said designated file section, means for transferring the initial character group from said designated file section, means for substituting a portion of said initial group for said stored section characters, means for modifying the substituted section characters as each successive one of said groups of characters is retrieved from each different designated file section, means for modifying the stored section address to designate the next file section from which the next character group is to be retrieved, means for employing the substituted section character to denote the reduced number of file sections still to furnish character groups, and means for determining the end of each message to be retrieved.

10. In a data processing system employing a computer which is responsive to a predetermined operation code for transferring a record between a plurality of fixed length storage sections in a bulk storage unit and the computer, a multiple section transfer circuit comprising, a storage circuit;

an operation code stored in said storage circuit;

a control field having a plurality of character storage positions and locatably identified by said operation code and stored in said storage circuit and including, at least one address character for designating the storage section at which a transfer operation is to begin, at least one first numeric section character for indicating that more than one section is to be transferred and, a plurality of data character positions into which the transferred message can be stored;

a plurality of records stored in the bulk storage unit;

each of said records having at least a second numeric section character for identifying the length of a corresponding record and address indicia for identifying a predetermined record in the bulk storage unit and a plurality of data storage sections for storing a plurality of data characters;

means for reading successive records from the bulk storage unit;

means responsive to said address character in said control field and said address indicia read from the bulk storage unit for locating said section at which the transfer operation is to commence;

means for transferring said initial data storage section from said bulk storage unit;

means for replacing said first numeric section character by said second numeric section character from said initial group;

means for modifying said replaced character as each successive one of said sections is retrieved; and means responsive to said replaced numeric section character for terminating the transfer operation.

11. In a data processing system employing a computer which is responsive to a predetermined operation code for transferring a record between a plurality of fixed length storage sections in a bulk storage unit and the computer, a multiple section transfer circuit, comprising, a storage circuit;

an operation code stored in said storage circuit;

a control field having a plurality of individually addressable character storage positions and locatably identified by said operation code and stored in said storage circuit and including, address indicia for designating the storage section at which a transfer operation is to begin, first numeric character indicia for indicating that at least two sections are to be transferred, and a plurality of data character positions into which the transferred message is stored;

a plurality of records stored in the bulk storage unit;

each of said records having second numeric section characters for identifying the length of a corresponding record and address indicia for identifying a predetermined record in the bulk storage unit and a plurality of data storage sections for storing a plurality of data characters;

said section characters being positioned between said address indicia and said data storage sections;

means for reading successive records from the bulk storage unit;

means responsive to said address indicia in said control field and said address characters read from the bulk storage unit for locating said section at which the transfer operation is to commence;

means for transferring said initial data storage section from said bulk storage device to said control field;

means for inserting said second numeric section characters read from said bulk storage unit into its said first numeric character positions in said control field;

means for decrementing the contents of said control field positions storing said second numeric section characters for each successive section transferred; and a decode circuit responsive to said second numeric section characters for terminating the transfer operation.

References Cited

UNITED STATES PATENTS

| | | | |
|---|---|---|---|
| 2,968,027 | 1/1961 | McDonnell et al. | 340—172.5 |
| 3,111,648 | 11/1963 | Marsh et al. | 340—172.5 |
| 3,163,850 | 12/1964 | Austin et al. | 340—172.5 |
| 3,289,175 | 11/1966 | Rice | 340—172.5 |

ROBERT C. BAILEY, *Primary Examiner.*

PAUL J. HENON, *Examiner.*

UNITED STATES PATENT OFFICE

CERTIFICATE OF CORRECTION

Patent No. 3,343,134 September 19, 1967

Kenneth D. Foulger, et al.

It is hereby certified that error appears in the above numbered patent requiring correction and that the said Letters Patent should read as corrected below.

Column 11, line 59, after "retrieved" insert a comma; column 13, line 22, strike out "reading", first occurrence; same line 22, after "for" insert -- reading --.

Signed and sealed this 22nd day of October 1968.

(SEAL)
Attest:

Edward M. Fletcher, Jr.
Attesting Officer

EDWARD J. BRENNER
Commissioner of Patents